United States Patent [19]

Ishiguro et al.

[11] Patent Number: 5,163,987
[45] Date of Patent: Nov. 17, 1992

[54] METHOD FOR PRODUCING GLASS PREFORM FOR OPTICAL FIBER

[75] Inventors: Yoichi Ishiguro; Michihisa Kyoto; Hiroo Kanamori, both of Yokohama, Japan

[73] Assignee: Sumitomo Electric Industries, Ltd., Osaka, Japan

[21] Appl. No.: 845,849

[22] Filed: Mar. 6, 1992

Related U.S. Application Data

[63] Continuation of Ser. No. 517,434, May 2, 1990, abandoned, which is a continuation of Ser. No. 196,767, May 17, 1988, abandoned, which is a continuation of Ser. No. 863,851, May 16, 1986, abandoned.

[30] Foreign Application Priority Data

May 17, 1985 [JP] Japan .................. 60-103997

[51] Int. Cl.⁵ ............... C03C 17/02; C03B 37/018
[52] U.S. Cl. ................... 65/3.12; 65/18.2; 65/105; 65/112; 65/900; 65/901; 65/DIG. 16
[58] Field of Search ............. 65/3.12, 18.2, 105, 65/112, 900, 901, DIG. 16

[56] References Cited

U.S. PATENT DOCUMENTS

| | | | |
|---|---|---|---|
| Re. 28,029 | 6/1974 | Keck | 65/3.12 |
| 3,806,570 | 4/1974 | Flamenbaum | 65/3.12 |
| 3,933,454 | 1/1976 | DeLuca | 65/3.12 |
| 4,164,102 | 8/1979 | Lohrum | 51/283 R |
| 4,165,224 | 8/1979 | Irven | 65/3.12 |
| 4,165,915 | 8/1979 | Rau | 65/3.12 |
| 4,447,292 | 5/1984 | Woldan | 156/644 |
| 4,629,485 | 12/1986 | Berkey | 65/DIG. 16 |

FOREIGN PATENT DOCUMENTS

| | | |
|---|---|---|
| 0139348 | 5/1985 | European Pat. Off. . |
| 139532 | 5/1985 | European Pat. Off. ....... 65/DIG. 16 |
| 140651 | 5/1985 | European Pat. Off. ....... 65/DIG. 16 |
| 0164103 | 12/1985 | European Pat. Off. . |
| 0195407 | 8/1986 | European Pat. Off. . |
| 55-67533 | 5/1980 | Japan ............... 65/DIG. 16 |
| 60-81033 | 5/1986 | Japan ............... 65/DIG. 16 |

*Primary Examiner*—Robert L. Lindsay
*Attorney, Agent, or Firm*—Cushman, Darby & Cushman

[57] ABSTRACT

A method for producing a glass preform for use in the fabrication of an optical fiber, which comprises adding fluorine to a soot preform in an atmosphere comprising a fluorine-coating compound at a temperature at which the soot preform is in the porous state and then keeping or inserting it in an atmosphere containing a fluorine-containing compound at a higher temperature to vitrify it to form a glass preform, from which glass preform, an optical fiber homogeneously containing fluorine is fabricated.

4 Claims, 3 Drawing Sheets

METHOD FOR PRODUCING GLASS PREFORM FOR OPTICAL FIBER

This application is a continuation of U.S. Pat. No. 07/517,734, filed May 2, 1990 which is a continuation of U.S. Pat. No. 07/196,767, filed May 17, 1988 which is a continuation of U.S. Pat. No. 06/863,851, filed May 16, 1986, all abandoned.

FIELD OF THE INVENTION

The present invention relates to a method for producing a glass preform for use in the fabrication of an optical fiber. More particularly, it relates to a method for producing a glass preform for use in the fabrication of an optical fiber which homogeneously contains fluorine and an extremely small amount of impurities.

BACKGROUND OF THE INVENTION

For the production of a glass preform added with fluorine methods have been proposed comprising depositing glass soot particles to form a soot preform and then dehydrating and vitrifying the soot preform by keeping or inserting it in a furnace containing an atmosphere comprising fluorine.

The first method is in Japanese Patent Kokai Publication (unexamined) No. 67533/1980 and comprises heating a soot preform in an atmosphere containing a fluorine-containing compound at a temperature not higher than 1,000° C. and then heating and vitrifying the soot preform in an atmosphere of an inert gas at a temperature not lower than 1,400° C. by keeping or inserting the soot preform 2 in an furnace 31 as shown in FIG. 1. Example 3 of Japanese Patent Kokai Publication (unexamined) No. 60938/1985 describes a similar method comprising heating a soot preform in an atmosphere containing $SF_6$ at 1,000° C. and vitrifying it in an atmosphere not containing $SF_6$ at 1,600° C. In addition, Japanese Patent Kokai Publication (unexamined) No. 86045/1985 describes a method comprising heating a soot preform in an atmosphere comprising a fluorine-containing compound at a temperature not lower than 1,000° C. and lower than 1,400° C. and then vitrifying the soot preform in an atmosphere of an inert gas at a temperature not lower than 1,400° C.

The second method comprises heating a soot preform in an atmosphere comprising a fluorine-containing compound and an inert gas at a temperature not lower than 1,400° C. to produce a glass preform containing fluorine, in which the soot preform 2 is inserted in a zone furnace 41 equipped with a heater 40 as shown in FIG. 3. A method similar to the above method is described in Japanese Patent Kokai Publication (unexamined) No. 5035/1986 and comprises heating a soot preform in an atmosphere comprising a fluorine-containing compound at 1,650° C. The reference disclosure that "since the dopant is absorbed in the soot preform during vitrification of the glass, the treatment becomes easier at a higher temperature and vitrification proceeds at a higher rate than at a lower temperature so that the production cost is reduced". Examples 1, 2 and 4 of Japanese Patent Kokai Publication (unexamined) No. 60938/1985 comprise heating a soot preform in an atmosphere comprising a fluorine-containing compound at 1,600° C. Further, claims 1 and 7 of Japanese Patent Kokai Publication No. 86049/1985 describe a method for producing dense glass by diffusing fluorine at a temperature in a sintering temperature range.

As the result of the study of the two methods, the following has been found:

According to the first method, the soot preform is heated in an atmosphere comprising the fluorine-containing compound in an apparatus as shown in FIG. 1 at a temperature not higher than 1,000° C., the porosity of the soot preform is reserved. Thereafter, the soot preform is vitrified in an atmosphere of the inert gas. The analysis of the distribution of the refractive index of the produced glass preform revealed that the refractive index at a peripheral portion of the preform is larger than that of the central portion as shown in FIG. 2 in which R stands for an outer diameter of the glass preform. This means that the added amount of fluorine in the peripheral portion is less than that in the central portion. The reason for this may be that, since at the end of the addition of fluorine at 1,000° C., the preform is still porous, added fluorine is dissipated during subsequent heating in the inert gas atmosphere at a higher temperature.

According to the second method, the soot preform is heated in an atmosphere comprising the fluorine-containing compound and the inert gas at a temperature not lower than 1,400° C. and then vitrified, the produced glass preform has a distribution of the refractive index shown in FIG. 4, from which it is understood that the added amount of fluorine is smaller in the central portion. The reason for this may be that, since the addition of fluorine and vitrification occur simultaneously, a period of time to add fluorine is not long so that a sufficient amount of the fluorine-containing compound does not reach the central portion. When the soot preform was inserted in the furnace at a rate less than a half of the practically employed rate, fluorine was homogeneously added to the central portion of the preform. However, the total treating time was extremely extended.

SUMMARY OF THE INVENTION

An object of the present invention is to provide a method for producing a glass preform for use in the fabrication of an optical fiber, in which fluorine is homogeneously added.

Another object of the present invention is to provide a method for producing a glass preform for use in the fabrication of an optical fiber which contains a smaller amount of impurities.

Accordingly, the present invention provides a method for producing a glass preform for use in the fabrication of an optical fiber, which comprises adding fluorine to a soot preform in an atmosphere comprising a fluorine-containing compound at a temperature at which the soot preform is in the porous state and then keeping or inserting it in an atmosphere containing a fluorine-containing compound at a higher temperature to vitrify it to form a glass preform.

DETAILED DESCRIPTION OF THE INVENTION

Figure 1:
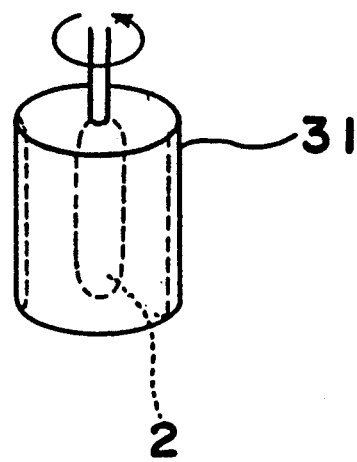
FIGS. 1 and 3 schematically show furnaces in which the soot preform is heated.
Figure 2:
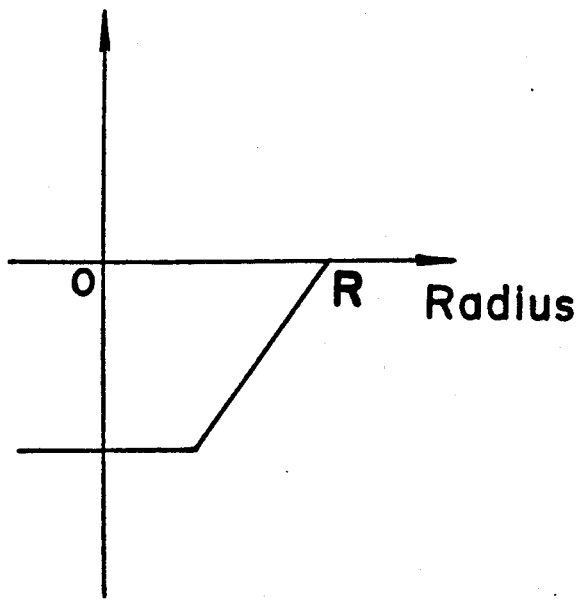
FIGS. 2 and 4 are graphs showing distributions of refractive index of conventional glass preforms.
Figure 3:
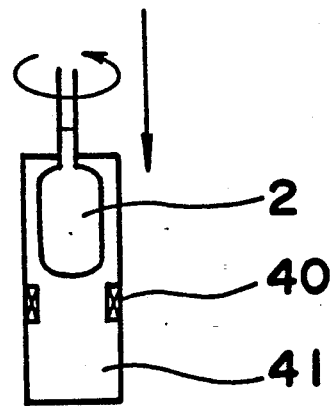

The soot preform to be treated by the method of the present invention may be produced by any of the conventional methods such as the VAD method, the OVD method, the OVPD method and the like.

According to the present invention, fluorine is added to the soot preform at a temperature at which the soot is still in the porous state. Thereafter, the soot preform added with fluorine is kept or inserted in a furnace having an atmosphere comprising the fluorine-containing compound at a higher temperature at which the soot preform is vitrified to give a transparent glass preform. Preferably, the fluorine-containing compounds used in the fluorine-adding step and the vitrifying step are the same. Specific examples of the fluorine-containing compound are $SiF_4$, $Si_2F_6$, $SF_6$, $NH_4F$, $NF_3$, $PF_5$ and $CF_4$, and chlorofluorocarbons such as $CCl_2F_2$, however, silicon fluorides such as $SiF_4$ $Si_2F_6$ are preferred, since they do not form bubbles in the glass preform even when the soot preform is vitrified at a higher temperature and a higher rate.

The addition of fluorine is preferably carried out at a temperature not lower than 1,100° C. and lower than 1,400° C. When the temperature is lower than 1,100° C., the reaction between the fluorine-containing compound and the soot preform does not take place. However, when the temperature is too high, the soot preform shrinks quickly. Since the fluorine is added at a temperature at which the soot preform is in the porous state, fluorine is sufficiently diffused to the central portion of the preform.

At a higher temperature, the fluorine-containing compound decomposes so as to dehydrate the soot preform. Therefore, any dehydrating agent such as a chlorine-containing compound is not necessarily used in the method of the present invention. For the purpose of dehydration, a fluorine-containing compound having no hydrogen atom such as $SiF_4$, $Si_2F_6$, $SF_6$ and $CF_4$ is preferred.

When a dehydrating agent is not used, impurities such as iron tend to remain in the vitrified preform, and an optical fiber fabricated from such a preform shows increase attenuation of light transmission at a wavelength of 0.8 to 1.3 μm. Therefore, it is preferred to use a chlorine-containing compound in the method of the present invention for dehydrating water and/or removing impurities. Dehydration with the chlorine-containing compound may be carried out prior to or simultaneously with the addition of fluorine.

The vitrification of the preform is preferably carried out in the absence of the chlorine-containing compound in view of an improvement of hydrogen resistance or radiation resistance. As the chlorine-containing compound, chlorine and carbon tetrachloride are preferred.

The addition of fluorine and the vitrification of the soot preform may be carried out in the same furnace or in separate furnaces.

Since the vitrification of the soot preform is carried out in the presence of the fluorine-containing compound, the fluorine added to the peripheral portion of the preform in the fluorine adding step is not dissipated in the vitrifying step. In addition, since the soot preform to which fluorine has been added is vitrified, the vitrification rate is not influenced by a period of time for adding fluorine so that the preform can be vitrified at a higher rate.

When the chlorine-containing compound is used, dehydration and removal of impurities are effectively performed so that it is possible to produce the glass preform containing a very small amount of impurities such as iron.

The embodiments of the present invention will be shown in the following examples.

EXAMPLE 1

A soot preform consisting of $SiO_2$ having a diameter of 90 mm and a length of 500 mm was produced by the VAD method and dehydrated, fluorine was added and the preform vitrified in a uniform heating furnace.

The preform was heated to 1,100° C. in a pure helium atmosphere. After reaching 1,100° C. until the completion of vitrification (at 1,550° C.), the soot preform was heated in an atmosphere consisting of 97% of helium and 3% of $SF_6$.

Figure 5:
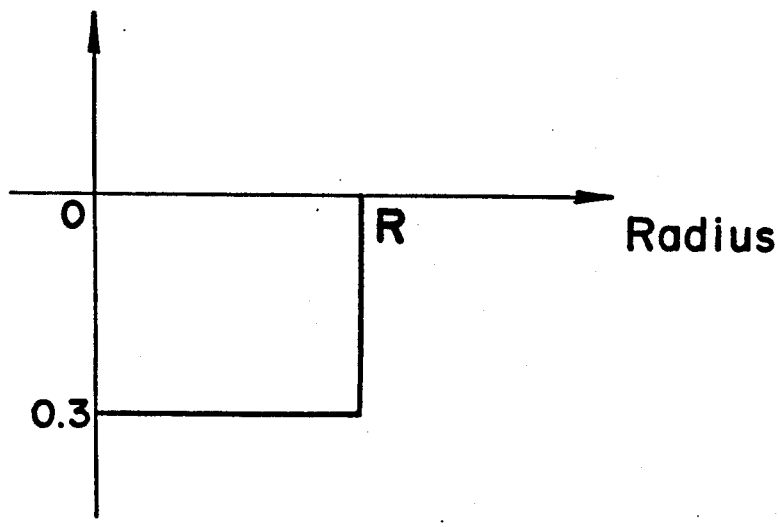
FIGS. 5 and 6 are graphs showing distributions of refractive index of the glass preforms produced according to the present invention.

The refractive index of the produced glass preform was measured by means of a preform analyzer. Fluorine was homogeneously added to the preform at an amount corresponding to a specific refractive index difference of $-0.3\%$ as shown in FIG. 5.

EXAMPLE 2

The same soot preform as used in Example 1 was heated by traversing it at a rate of 6 mm/min. in a zone furnace containing an atmosphere consisting of 92% of helium and 8% of $SiF_4$ with keeping the heater surface temperature at 1,350° C. Then, the soot preform with fluorine added fluorine was heated by traversing it at a rate of 6 mm/min. in the same atmosphere with keeping the heater surface temperature at 1,650° C. to vitrify it. No chlorine-containing compound was used.

Figure 6:
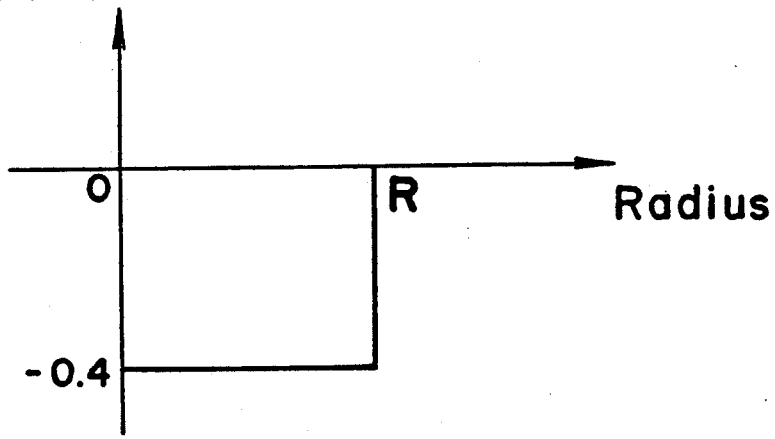

The refractive index of the produced glass preform was measured by means of a preform analyzer. Fluorine was homogeneously added to the preform at an amount corresponding to a specific refractive index difference of $-0.4\%$ as shown in FIG. 6. The content of hydroxyl groups in the glass preform was less than the limit of detection by a IR absorption method.

COMPARATIVE EXAMPLE 1

Figure 4:
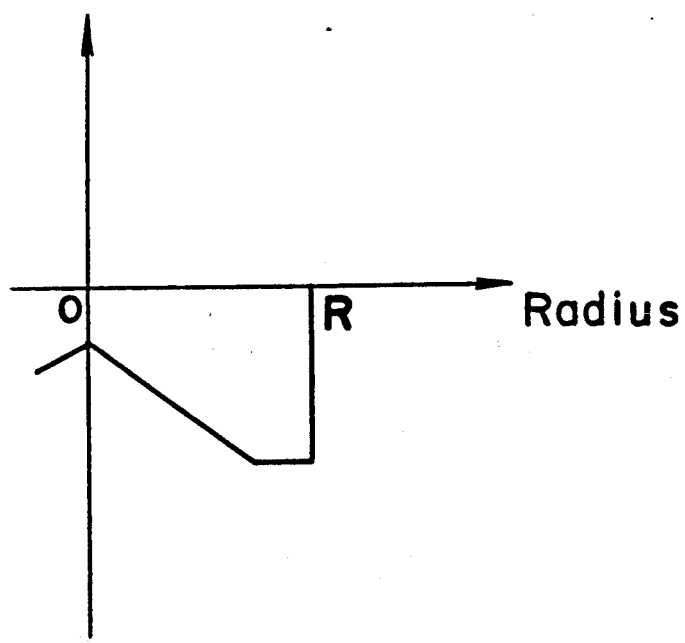

The same soot preform as used in Example 1 was heated by traversing it at a rate of 3 mm/min. in the zone furnace containing an atmosphere consisting of 92% of helium and 8% of $SiF_4$ with keeping the heater surface temperature at 1,650° C. to add fluorine and simultaneously vitrify the soot preform. Although the total treating time was substantially the same as in Example 2, the produced glass preform had a distribution of the refractive index as shown in FIG. 4.

EXAMPLE 3

The same soot preform as used in Example 1 was heated by keeping it in the furnace containing an atmosphere consisting of 97% of helium and 3% of $SF_6$ kept at 1,200° C. Then, the fluorine-added preform was inserted at a rate of 6 mm/min. in another zone furnace with a surface temperature of 1,650° C. containing an atmosphere consisting of 97% of helium and 3% of $SF_6$ to vitrify it.

The produced glass preform homogeneously contained fluorine and the content of the hydroxyl groups was less than the limit of detection by the IR absorption method. The distribution of the refractive index was as shown in FIG. 5.

EXAMPLE 4

A soot preform consisting of $SiO_2$ having a diameter of 120 mm, a length of 550 mm was produced by the VAD method and dehydrated, added with fluorine and vitrified in a uniform heating furnace.

The preform was firstly heated to 1,100° C. in a pure helium atmosphere and from 1,100° C. to 1,400° C. in an atmosphere consisting of 99.6% of helium and 0.4% of $SF_6$ to perform dehydration and addition of fluorine. Then, the fluorine-added preform was vitrified at 1,550° C. in the latter atmosphere.

Fluorine was homogeneously added to the preform at an amount corresponding to a specific refractive index difference of −0.18%.

By using the thus produced glass preform as a core material and a dehydrated quartz glass containing fluorine in an amount corresponding to a specific refractive index difference of −0.5%, an optical fiber was fabricated. The optical fiber had transmission loss of 0.8 dB/km due to the hydroxyl groups at a wavelength of 1.38 μm.

EXAMPLE 5

The same soot preform as used in Example 4 was treated in the zone furnace under following conditions:

First Step [Dehydration and Removal of Impurities]

Atmosphere: 98% of helium, 2% of $Cl_2$
Heater surface temperature: 1,150° C.
Traversing rate: 6 mm/min.

Second Step [Addition of Fluorine]

Atmosphere: 97% of helium, 3% of $SiF_4$
Heater surface temperature: 1,350° C.
Traversing rate: 6 mm/min.

Third Step [Vitrification]

Atmosphere: 97% of helium, 3% of $SiF_4$
Heater surface temperature: 1,650° C.
Traversing rate: 6 mm/min.

The refractive index of the produced glass preform was measured by means of a preform analyzer. Fluorine was homogeneously added to the preform at an amount corresponding to a specific refractive index difference of −0.3%. The transparent glass preform contained no bubble.

The glass preform was bored by means of a ultrasonic borer. In the bore, a highly pure quartz rod was inserted and drawn to fabricate an optical fiber, which had attenuation of light transmission of 0.35 dB/km at a wavelength of 1.3 μm and transmission loss due to the hydroxyl group of 0.5 dB/km at a wavelength of 1.38 μm.

EXAMPLE 6

The same soot preform as used in Example 4 was treated in the zone furnace under following conditions:

First Step [Dehydration, Removal of Impurities and Addition of Fluorine]

Atmosphere: 89% of helium, 3% of $SiF_4$, 7% of oxygen, 1% of $CCl_4$
Heater surface temperature: 1,350° C.
Traversing rate: 6 mm/min.

Second Step [Vitrification]

Atmosphere: 97% of helium, 3% of $SiF_4$
Heater surface temperature: 1,650° C.
Traversing rate: 6 mm/min.

The refractive index of the produced glass preform was measured by means of a preform analyzer. Fluorine was homogeneously added to the preform at an amount corresponding to a specific refractive index difference of −0.3%. The transparent glass preform contained no bubble.

The glass preform was bored by means of a ultrasonic borer. In the bore, a highly pure quartz rod was inserted and drawn to fabricate an optical fiber, which had attenuation of light transmission of 0.35 dB/km at a wavelength of 1.3 μm and transmission loss due to the hydroxyl group of 0.5 dB/km at a wavelength of 1.38 μm.

EXAMPLE 7

Around a transparent glass rod consisting of a pure quartz made core having an outer diameter of 2 mm and a cladding made of a quartz added with fluorine in a amount corresponding to a specific refractive index difference of −0.3% having an outer diameter of 10 mm, glass soot particles were deposited to an outer diameter of 120 mm. The produced composite was treated in the zone furnace under following conditions:

First Step [Dehydration Removal of Impurities and Addition of Fluorine]

Atmosphere: 97% of helium, 3% of $SiF_4$
Heater surface temperature: 1,350° C.
Traversing rate: 6 mm/min.

Second Step [Vitrification]

Atmosphere: 97% of helium, 3% of $SiF_4$
Heater surface temperature: 1,650° C.
Traversing rate: 6 mm/min.

The vitrified preform contained no bubble. The transparent glass preform was drawn to fabricate an optical fiber, which had attenuation of light transmission of 0.34 dB/km at a wavelength of 1.3 μm and transmission loss due to the hydroxyl group of 0.6 dB/km at a wavelength of 1.38 μm.

The presence of impurities which were not removed by the fluorine-containing compound did not materially influence the quality of the optical fiber.

What is claimed is:

1. A method for producing a glass preform for use in the fabrication of an optical fiber, which comprises the steps of:

a) adding fluorine to an undoped soot preform comprised of $SiO_2$ glass particulates by heating said soot preform at a temperature of not lower than 1,100° C. and lower than 1,400° C. in an atmosphere consisting essentially of a gaseous silicon fluoride and an inert gas, said atmosphere being free of any chlorine-containing compound, wherein said gaseous silicon fluoride is $SiF_4$ or $Si_2F_6$, so as to diffuse said gaseous silicon fluoride homogeneously throughout the preform, b) vitrifying the fluorine-added soot preform in said atmosphere by heating a surface of said soot preform to a temperature of at least 1550° C., to form a transparent glass preform, c) boring said transparent glass preform by means of an ultrasonic borer to form a tube, d) inserting a quartz rod having a higher refractive index than said tube refractive index in the formed bore of said tube, and e) collapsing said tube onto said rod to form said glass preform, wherein the steps a) and b) are carried out in a zone furnace and traverse velocity of the soot preform in step (a) is not less than traverse velocity of step (b), which traverse velocity of step (b) is 6 mm/minute.

2. The method according to claim 1, wherein the soot preform is dehydrated with a chlorine-containing compound prior to the fluorine-adding step, and the vitrifying step is carried out in an atmosphere being free of any chlorine-containing compound.

3. A method for producing a glass preform for use in the fabrication of an optical fiber, which comprises the steps of:
   a) dehydrating and removing impurities with a chlorine-containing compound in an undoped soot preform comprised of $SiO_2$ glass particulates,
   b) adding fluorine to said soot preform by heating said soot preform at a temperature of not lower than 1,100° C. and lower than 1,400° C. in an atmosphere consisting essentially of a gaseous silicon fluoride and an inert gas, wherein said gaseous silicone fluoride is $SiF_4$ or $Si_2F_6$, so as to diffuse said gaseous silicon fluoride homogeneously throughout the preform, wherein the dehydrating and removing impurities step is carried out simultaneously with the adding step.
   c) vitrifying the fluorine-added soot preform in an atmosphere being free of any chlorine-containing compound by heating a surface of the soot preform to a temperature of at least 1550° C., to form a transparent glass preform,
   d) boring said transparent glass preform by means of an ultrasonic borer to form a tube,
   e) inserting a pure quartz rod in the formed bore of said tube, and
   f) collapsing said tube onto said rod to form said glass preform, wherein the steps a), b) and c) are carried out in a zone furnace and traverse velocity of the soot preform in step (b) is not less than traverse velocity of step (c), which traverse velocity of step (c) is 6 mm/minute.

4. A method for producing a glass cladding for a silica glass preform used in the fabrication of an optical fiber, which comprises the steps of:
   a) adding fluorine to an undoped soot preform comprised of $SiO_2$ glass particulates by heating said soot preform at a temperature of not lower than 1,100° C. and lower than 1,400° C. in an atmosphere consisting essentially of a gaseous silicon fluoride and an inert gas, said atmosphere being free of any chlorine-containing compound, wherein said gaseous silicon fluoride is $SiF_4$ or $Si_2F_6$, so as to diffuse said gaseous silicon fluoride homogeneously throughout the preform,
   b) vitrifying the fluorine-added soot preform in said atmosphere by heating a surface of the soot preform to a temperature of at least 1550° C., to form a transparent glass preform, and
   c) boring said transparent glass preform by means of an ultrasonic borer to form a tube, wherein the steps a) and b) are carried out in a zone furnace and traverse velocity of the soot preform in step (a) is not less than traverse velocity of step (b), which traverse velocity of step (b) is 6 mm/minute.

* * * * *